Patented May 4, 1948

2,440,893

UNITED STATES PATENT OFFICE 2,440,893

METHOD FOR INHIBITING PREMATURE VULCANIZATION OF RUBBER

Arthur W. Campbell, Terre Haute, Ind., assignor to Commercial Solvents Corporation, Terre Haute, Ind., a corporation of Maryland No Drawing. Application January 1, 1945, Serial No. 571,019

3 Claims. (Cl. 260—724)

This invention relates to a method for inhibiting the vulcanization of rubber material containing accelerators of vulcanization, and more particularly to a method for inhibiting vulcanization in the lower temperature range within which the rubber material is in a plastic, flowable state.

In the process of vulcanizing rubber materials, accelerators of vulcanization are commonly used in combination with the vulcanizing agent to speed up the time of vulcanization and to impart various desired specific properties to the finished rubber and the like.

For some purposes, however, it is desirable to temporarily delay vulcanization of the rubber mix for a limited period while the rubber stock is in a plastic flowable state. Such purposes include the operations wherein the mix is to be formed by molding and the mix is heated to a plastic state, and must flow and completely fill the mold before vulcanization and setting take place. Examples of such operations are those utilizing injection molding and the operations used in the manufacture of sponge rubber.

In the manufacture of sponge rubber, a gas producing material such as sodium bicarbonate is incorporated with the stock, and the batch is heated to a temperature sufficiently high to cause the stock to become plastic and extensible, and at the same time to decompose the sodium bicarbonate or other gas former, liberating gas such as carbon dioxide which expands within the batch to produce the cellular structure known as "sponge." This operation is known as "blowing" in the trade. When even moderately active accelerators are used, considerable vulcanization may occur at the relatively low temperatures employed for blowing, resulting in premature stiffening of the stock which in turn results in an incomplete "blow" and in failure of the stock to fill the mold. Similar ill effects may occur where the stock is to be used for injection molding wherein a plasticized stock is injected into a hot mold, and in other processes where the stock must flow to a certain extent before setting. In injection molding the stock must remain plastic at least until the stock fills the hot mold, and premature vulcanization and stiffening of the stock before the stock is completely shaped results in unsatisfactory objects which must be rejected.

I have now found that premature vulcanization at moderately elevated temperatures at which rubber stocks are plastic and flowable can be avoided and yet the advantages of the accelerated stocks can be obtained at slightly more elevated temperatures, by my invention in which aliphatic nitro alcohols are added to accelerated rubber stocks.

In carrying out my invention the nitro alcohol is added in any desired manner to the rubber stock such as in solid, liquid or solution form together with the various other compounding ingredients such as vulcanizing agents, accelerators, antioxidants, pigments, gas forming agents and the like, and the stock is milled in the usual way to form a homogeneous mass.

The amount of nitro alcohol required will vary somewhat with the particular nitro alcohol, the accelerator used and with the temperature and time during which vulcanization is to be delayed. In general I have found that a quantity of from about 0.5 to 10% of nitro alcohol based on the weight of rubber material present is sufficient for the usual molding operations, and quantities between 1 and 5% on the above basis are generally preferred.

The nitro alcohols suitable for use as vulcanization retarders are any of the aliphatic nitro alcohols, for example, 2-nitro-1-propanol, 1-nitro-2-propanol, 2-nitro-2-methyl-1-propanol, 2-nitro-1-butanol, 3-nitro-2-butanol, 1-nitro-2-butanol, 3-nitro-4-heptanol, 2-nitro-2-methyl-1,3-propanediol, 2-nitro-2-ethyl-1,3-propanediol, tris(hydroxymethyl) nitromethane and the like.

In order to best secure the advantages of my invention, it is desirable to carry out the forming or molding process in two steps, the first at a moderately elevated temperature high enough to induce good plasticity and flow characteristics of the stock, and yet not high enough for the inhibiting effect of the nitro alcohol on vulcanization to be overcome. Ordinary rubber stocks begin to become plastic in a temperature range considerably below that sufficient for complete vulcanization, the temperature of vulcanization depending to some extent on the accelerator used. However, although only slight vulcanization usually takes place in the lower temperature ranges of plasticity, still this tendency is sufficient to markedly impair the flowing, mold filling characteristics in the case of injection molding and to impair the expansion and sponge forming as well as mold filling characteristics in the case of sponge rubber.

The inhibiting effect on vulcanization of the nitro alcohols is effective only in this lower range of rubber plasticity, and is overcome or destroyed at somewhat higher temperatures. Thus by the two stage molding process, the stock is first plasticized, and allowed to expand or flow so as to fill the mold and in the case of sponge rubber to assume the desired cellular structure, at the lower temperatures within the range of temperatures at which the stock is flowable, and then after these characteristics have been attained, the stock is subjected to a higher temperature at which the vulcanization inhibiting effect of the nitro alcohol is overcome, and at this temperature the stock vulcanizes and sets in the desired shape or form.

The use of nitro alcohols is effective to inhibit premature vulcanization of accelerated rubber stocks in which the accelerator is of the acidic type, for example, accelerators of the thiazol type and of the thiuram type such as benzothiazyldisulfide, tetramethyl-thiuram disulfide, 2-mercaptothiazol, 2-mercaptobenzothiazol, tetraethylthiuram disulfide, nitromercaptobenzothiazol and the like.

Examples of the performance of various nitro alcohols under the conditions of preparation of sponge rubber are given in the table below.

These tests are merely illustrative of my invention, and it will be understood that in carrying out the various types of molding contemplated by my invention, suitable modifications will be made, as known to those skilled in the art, in the rubber formulas used, the curing and compounding operations and the like. For example, in stocks suitable for injection molding, the sodium bicarbonate would, of course, be eliminated and the proportion of stearic acid would be reduced.

In the tests described below, the nitro alcohol was added in the proportions indicated based on 100 parts of rubber in the test formula given below.

TEST FORMULA

|  | Parts |
|---|---|
| Rubber | 100 |
| Zinc oxide | 5 |
| Sulfur | 4 |
| Accelerator-(benzothiazyldisulfide) | 1.25 |
| Carbon black | 40 |
| Stearic acid | 10 |
| Oil | 10 |
| Sodium bicarbonate | 15 |
| Antioxidant (phenyl β-napthylamine) | 2 |

In compounding the above stock, the rubber was plasticized by 2 passes through a tight mill after which the compounding ingredients, namely, zinc oxide, sulfur, carbon black, accelerator and antioxidant were added in the customary manner. The compounded sheet was then further plasticized by 25 passes through a tight mill, after which the oil, sodium bicarbonate, stearic acid and nitro alcohol were milled in, in the customary manner. Sheets ¼" x 10" x 12" were cured in a mold ¾" x 10" x 12" giving the stock an opportunity to expand to three times its original volume. The stock was heated in the mold for 30 minutes at 260° F. to plasticize the stock, decompose the sodium bicarbonate and allow the stock to expand and fill the mold. There should be no vulcanization during this curing and expansion period. It will be observed that with no nitro alcohol present, considerable premature vulcanization took place during the preliminary heating period, preventing filling of the mold. In every case in which nitro alcohol was used, the vulcanization during the preliminary heating period was inhibited to a greater or lesser extent, in many cases resulting in a virtually complete filling of the mold, to produce perfectly molded specimens.

After the preliminary heating period, the steam pressure on the molding platens of the test pieces was raised to 45 lb./sq. inch which corresponds to 293° F. This temperature was maintained for 30 minutes, whereupon the mold was opened and the sheet was recovered. The results are listed in the table below.

TABLE

*Inhibition of prevulcanization of sponge rubber by various nitro alchools added to test formula given above*

| Nitro alcohol | Amount per 100 parts Rubber | Blow | Molding |
|---|---|---|---|
| 2-Nitro-2-methyl-1-propanol (solid) | 5 | Good | Perfect. |
| Do | 3.2 | do | Good. |
| Do | 1.6 | do | Perfect. |
| Do | 0.8 | do | Good. |
| 2-Nitro-2-methyl-1-propanol (25% solution) | 5 | do | Excellent. |
| 2-Nitro-1-butanol | 5 | do | Fair. |
| 2-Nitro-3-butanol | 5 | do | Do. |
| 3-Nitro-4-heptanol | 5 | do | Do. |
| 2-Nitro-2-methyl-1,3-propanediol | 5 | do | Do. |
| 2-Nitro-2-ethyl-1,3-propanediol | 5 | do | Do. |
| Tris (hydroxymethyl) nitromethane | 5 | do | Perfect. |
| None (Control) | None | do | Very poor. |

While the above describes the preferred embodiments of my invention, it will be understood that departures may be made therefrom within the scope of the specification and claims.

What is claimed is:

1. A process for preparing sponge rubber which comprises adding a lower substituted nitro alkanol having the structural formula

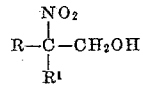

where R and R¹ have the same values and are selected from the group consisting of CH₃ and CH₂OH, to a rubber stock containing an acidic accelerator and a gas forming ingredient, heating the stock at a temperature high enough to produce plasticity of the rubber stock and decomposition of the gas forming ingredient, but low enough to be within the range within which the vulcanization inhibiting effect of the said lower substituted nitro alkanol is operative, maintaining said stock at said temperature until the desired complete expansion of the stock has taken place, and thereafter raising the temperature of the stock to a temperature at which the inhibiting effect of the said lower substituted nitro alkanol is overcome, whereby the stock is vulcanized and set in its completely expanded "sponge" form.

2. A process for preparing sponge rubber which comprises adding 2-nitro-2-methyl-1-propanol to a rubber stock containing an acidic accelerator and a gas-forming ingredient, heating the stock at a temperature high enough to produce plasticity of the rubber stock and decomposition of the gas-forming ingredient, but low enough to be within the range within which the vulcanization inhibiting effect of the 2-nitro-2-methyl-1-propanol is operative, maintaining said stock at said temperature until the desired complete expansion of the stock has taken place, and thereafter raising the temperature of the stock to a temperature at which the inhibiting effect of the said 2-nitro-2-mehyl-1-propanol is overcome, whereby the stock is vulcanized and set in its completely expanded "sponge" form.

3. A process for preparing sponge rubber which comprises adding tris(hydroxymethyl)nitromethane to a rubber stock containing an acidic accelerator and a gas-forming ingredient, heating the stock at a temperature high enough to produce plasticity of the rubber stock and decomposition of the gas-forming ingredient, but low enough to be within the range within which the vulcanzation inhibiting effect of the tris(hydroxymethyl)nitromethane is operative, maintaining said stock at said temperature until the desired complete expansion of the stock has taken place, and thereafter raising the temperature of the stock to a temperature at which the inhibiting effect of the said tris(hydroxymethyl)-nitromethane is overcome, whereby the stock is vulcanized and set in its completely expanded "sponge" form.

ARTHUR W. CAMPBELL.

REFERENCES CITED

The following references are of record in the file of this patent:

UNITED STATES PATENTS

| Number | Name | Date |
|---|---|---|
| 1,998,559 | Sibley | Apr. 23, 1935 |
| 2,231,950 | Roberts et al. | Feb. 18, 1941 |
| 2,297,871 | Campbell | Oct. 6, 1942 |
| 2,304,335 | Campbell | Dec. 8, 1942 |